(12) United States Patent
Rotem et al.

(10) Patent No.: US 8,539,269 B2
(45) Date of Patent: Sep. 17, 2013

(54) APPARATUS AND METHOD FOR HIGH CURRENT PROTECTION

(75) Inventors: Efraim Rotem, Haifa (IL); Avinash N. Ananthakrishnan, Hillsboro, OR (US); Doron Rajwan, Rishon Le-Zion M (IL); Kosta Luria, Pardesiya M (IL); Ronny Korner, Haifa (IL); Dan Baum, Haifa (IL)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 13/077,618

(22) Filed: Mar. 31, 2011

(65) Prior Publication Data

US 2012/0254641 A1    Oct. 4, 2012

(51) Int. Cl.
*G06F 1/32* (2006.01)

(52) U.S. Cl.
USPC .......................................... 713/320; 713/300

(58) Field of Classification Search
USPC ................................................... 713/320, 300
See application file for complete search history.

(56) References Cited

U.S. PATENT DOCUMENTS 7,337,339 B1 * 2/2008 Choquette et al. ............ 713/320
8,214,663 B2 * 7/2012 Floyd et al. ................... 713/300

* cited by examiner

*Primary Examiner* — Albert Wang
(74) *Attorney, Agent, or Firm* — Kacvinsky Daisak PLLC

(57) ABSTRACT

An apparatus may comprise one or more processor cores of a processor and a set of current limiters. Each current limiter may be coupled to a respective processor core and arranged to monitor processor activity in the processor, to compare the processor activity to one or more current limits of multiple current limits; and to initiate a current-limiting action when the one or more current limits is exceeded.

28 Claims, 9 Drawing Sheets

APPARATUS AND METHOD FOR HIGH CURRENT PROTECTION

BACKGROUND

As integrated circuit device scaling continues, the central processing unit (CPU) current levels continue to increase due to several factors: an increase in the number of transistors per unit area on a die; introduction of new performance features; an increase in the number of cores in a processor; and reduction in supply voltage while the power envelope remains constant.

Among the deleterious impacts of increased current are the need to design a higher power voltage regulator and system power supply, the need for higher voltage to compensate for IR droop, an increase in the number of capacitors required and the need for better voltage regulators to supply higher current. Guard-banding is a technique that compensates for expected maximum current (Icc), degradation caused by factors such as excess current, and may involve degrading threshold voltage or increasing operating voltage ($V_{DD}$) among other things.

In particular, at present, the maximum current for a CPU is determined by the worst case "power virus" and is handled as a given worst case. The term power virus generally refers to a carefully tuned computer program that executes specific machine code in order to reach the maximum CPU power dissipation (thermal energy output for the central processing unit). Computer cooling apparatus are designed to dissipate power up to the Thermal Design Power (TDP), rather than maximum power, and a power virus could cause the system to overheat; if it does not have logic to stop the processor, this may cause permanent damage.

The need to set the maximum current limitation to account for such problems as power virus-induced current increase may place severe constraints on operation of processors, such as multicore processors. Among present day approaches to address the constraints placed by the maximum current limitations efforts focused on:

Designing for worst case current

Designing the voltage regulator to "typical" worst case, adding statistical evaluation and not sum of worst cases of the entire system. Such a voltage regulator is equipped with over current protection that provides feedback on overload and eventually shuts down in critical conditions.

Increasing voltage guard-bands dynamically when high current is detected.

However, these approaches suffer from several problems. The approaches employ analog detection that results in a high degree of inaccuracy and requires calibration. These approaches also have difficulty meeting required bandwidth, and the response time for increasing guard-bands or responding to feedback may be to too long, thereby impacting performance. In worst case power virus scenarios, for example, current surges may develop within several nanoseconds. In systems that employ voltage regulators to implement a control loop, the response time is too slow to address such surges in a timely fashion.

It is with respect to these and other considerations that the present improvements have been needed.

BRIEF DESCRIPTION OF THE DRAWINGS

FIG. 1b depicts an embodiment of the system of FIG. 1a.

FIG. 1c depicts another embodiment of the system of FIG. 1a.

FIG. 6 depicts one embodiment of processes in the method of FIG. 5a.

DETAILED DESCRIPTION

Figure 1A:
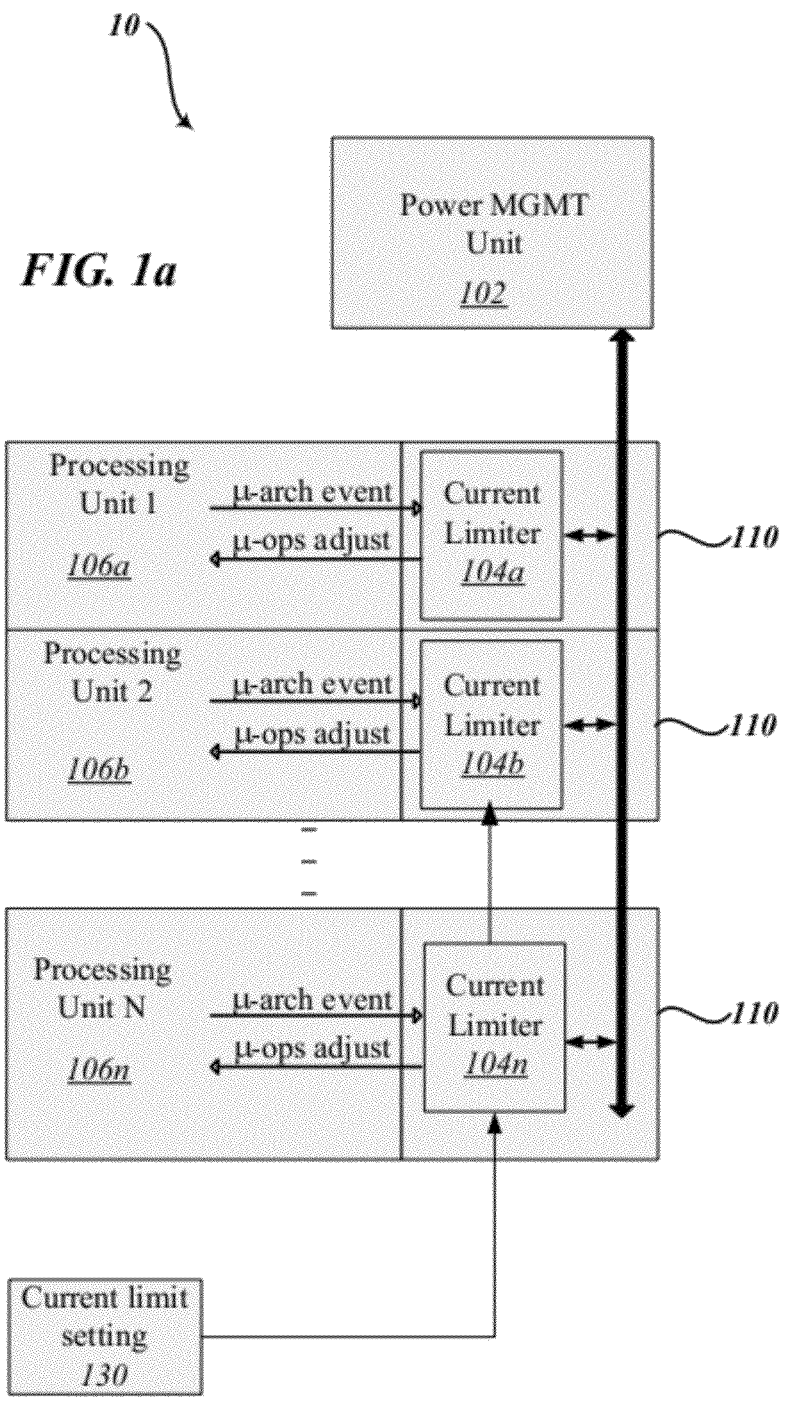
FIG. 1a depicts a system for high current protection according to various embodiments.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments provide an architecture for implementing rapid response to detected events in a central processing unit (CPU) that may limit the increase in processor current. In some embodiments, the voltage guard bands for operating processor cores of a CPU may be reduced by providing current overprotection.

Various embodiments provide an architecture for detecting a mode change of the CPU that can consume high current and apply power reduction technique before the high current condition can develop. In some embodiments, such mode change may involve waking up core from sleep state (C-state), increasing frequency (P-state) or activating additional functional blocks.

In various embodiments, incipient high current events may be extinguished by rapid detection at the core clock speed and a concomitant response at the micro-architectural level. In some embodiments, the response to a high current event may, but need not, involve two or more response mechanisms, including a rapid response that prevents a high current event from taking hold and a more gradual response that may optimize CPU performance until low current operation is restored. In this manner, the processor operation can be designed for maximum current for normal workloads, reducing the voltage and frequency thereby reducing power consumption.

In various embodiments, a CPU may include a power management unit (PMU) that is arranged to receive a limit that represents the maximum current permitted to be consumed by a processor. A voltage regulator, Power Supply Unit, BIOS, driver or platform Embedded Controller may report this limit to the PMU. The limit may be a voltage regulator limit or that of a power supply coupled to an AC source. In some embodiments, the reporting of the limit may be performed via a model specific register (MSR), memory mapped I/O, or an out-of-band communication link.

In various embodiments, the operation of processor units such as processor cores may be monitored to determine when current consumption exceeds a maximum permissible current (current limit). In some embodiments, a PMU may detect the state of a processor core when a maximum permissible current is exceeded. According to various embodiments, the PMU may determine if the current consumption in a core state that the PMU detects exceeds the maximum permitted current in different ways.

In some embodiments, such as for fast-developing current events (on the order of micro-seconds or less), detection may take place by monitoring micro-architectural events to determine if certain events exceed a threshold. In some embodiments, before an architectural change is implemented in a processing unit such as a processor core, a calculation may be performed to determine if operation of a processor in a new state will cause the maximum permissible current to be exceeded.

In other embodiments, such as for slower developing current events (~1 msec or more), actual power consumption of a processor may be monitored and calculated, such as by using a known micro-architectural power meter scheme (see, e.g., U.S. Pat. Nos. 7,757,103 and 7,430,672) or by providing an external analog current measurement and analog-to-digital conversion of the result.

In various embodiments, a CPU may respond to a current event in different ways. In one embodiment, in response to a fast developing current event a throttling may be performed on a the processor unit, such as a core or cores where high current event is detected. The throttling may involve reducing micro-operations input rate in one example. In another embodiment, a scheduled change in processor frequency and or voltage may be altered in response to the detected high current event.

In another embodiment, in response to a slower developing current event, after a high current event is detected, the core state operation can be altered.

FIG. 1a depicts a system 10 for high current protection according to various embodiments. In the embodiment specifically illustrated, a multiple-processing-unit processor architecture is shown. In various embodiments, the processing units 106, which are linked to a power management unit (PMU) 102, may be processor cores, graphics processing units, other processors, or combination of thereof. However, in some embodiments, a single processor unit, such as a single core architecture, is possible. A multi-core processor may have any desired number of cores, such as 2, 4, 8, or other number. As illustrated, each processor unit 106 may be coupled to a respective current limiter 104 that may monitor and regulate processes in the respective processor unit in order to avoid over-current conditions. A current limit input 130 may load a limit (also termed "threshold") to the current limiters 104, which threshold may specify a maximum permissible current, for example. The current limit may be supplied from a VR (not shown), a power supply (not shown), BIOS, driver or may be hard coded, and may be provided to the PMU to enable control of operation of processing units 106. The current limit may be supplied once at configuration time or as a run time value from an external control mechanism.

In various embodiments each current limiter 104 may be arranged to monitor processor activity in the processor. The processor activity may include micro-operations that are taking place in a given processing unit, the level of current that is associated with a processing unit such as the current consumption of one or more processor cores, or a scheduled change of state of a processing unit such as sleep state or power saving mode, among other activity. The current limiters 104 may also be arranged to compare the processor activity to one or more current limits of multiple current limits that may be provided to and/or stored in system 10. The current limiters 104 may further be arranged to initiate a current-limiting action when a threshold is exceeded, as detailed below.

Figure 1B:
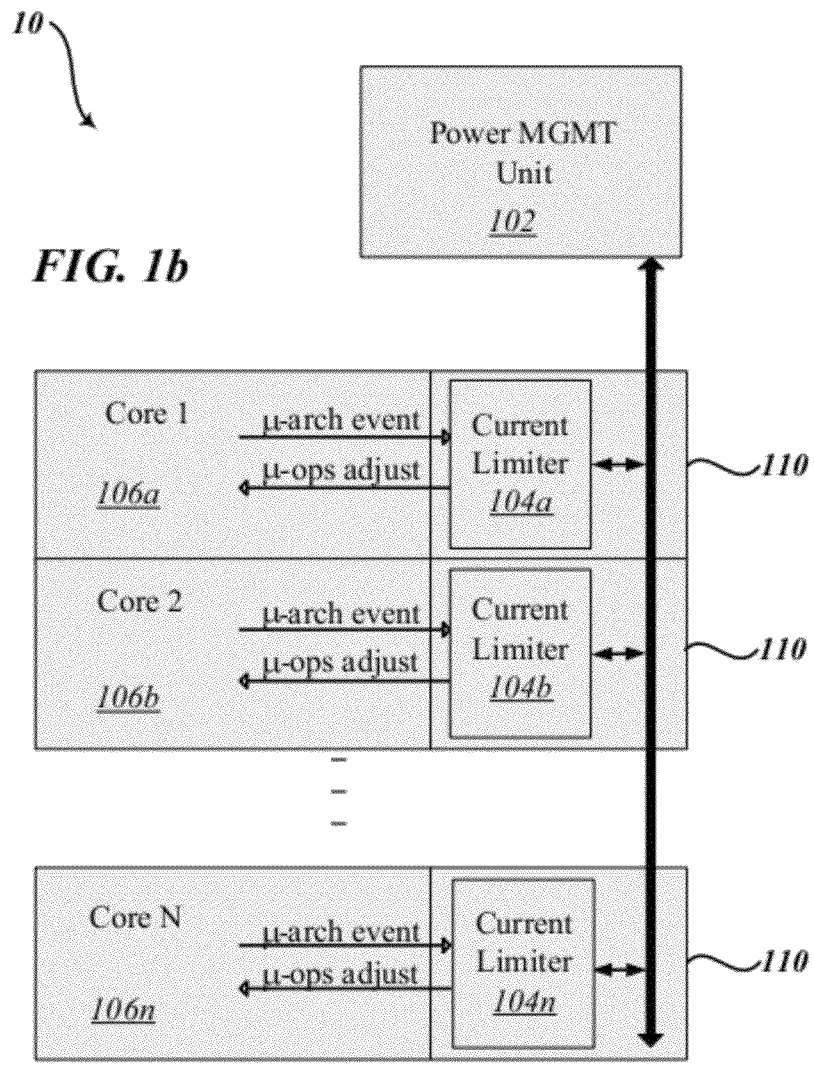
Figure 1C:
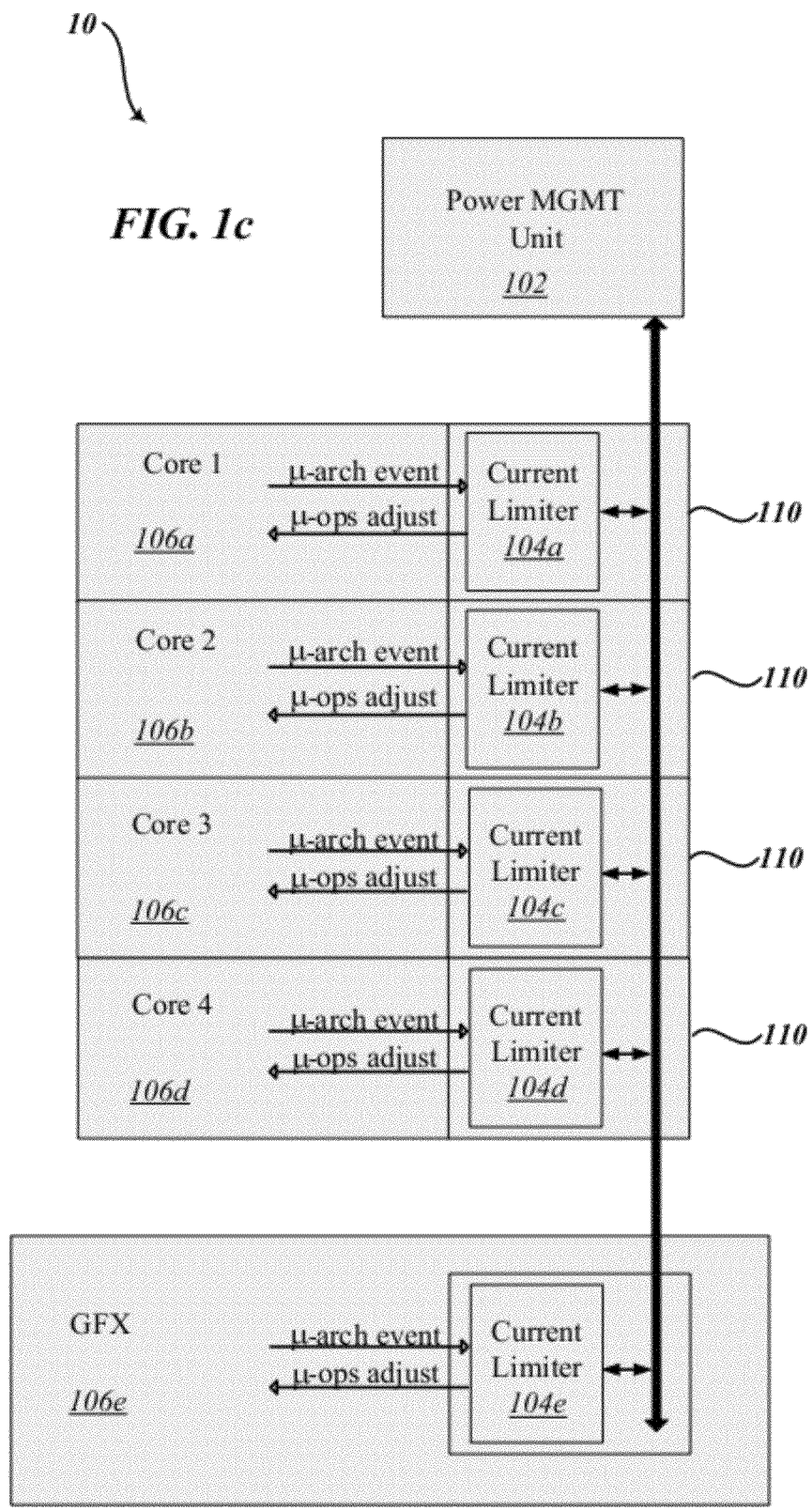

FIG. 1b depicts an embodiment of system 10 that includes N microprocessor cores 106 each coupled to a respective current limiter 104, while FIG. 1c depicts another embodiment of system 10 that includes four microprocessor cores 106a-d and one graphics processor core 106e, each also coupled to a respective current limiter 104 (although not shown, a current limit input 130 may be included in the embodiments of FIGS. 1b, 1c). For purposes of illustration, the processor units 106 may simply be referred to as cores in the discussion to follow. In accordance with various embodiments, system 10 may act in several ways to limit current in the CPU as detailed below.

In some embodiments, each processing unit (core) 106 and corresponding current limiter 104 may be arranged as a "slice" 110 of a CPU that includes a power management unit 102 coupled to the slices 110, as depicted. In some embodiments, each current limiter 104 may be arranged within an uncore region of a multicore processor. During operation of a CPU that includes cores 106, a current limiter 104a may be arranged to monitor core 106a, while current limiter 104b monitors core 106b, and so forth, for each core 106.

Each current limiter 104 may be arranged to continuously or regularly monitor a corresponding processor core 106 so that potential high current excursions can be avoided by responding to specific events taking place in the core in a rapid fashion. In particular, rather than monitor current or voltage changes, each current limiter 104 may monitor specific micro-architectural (μ-arch) events as they take place within a given processor core 106. By monitoring operations in a processor core 106 for specific micro-architectural events associated with high current, a current limiter 104 may detect the suspect micro-architectural events before a current surge or at the incipient stages of a current surge. For example, the suspect micro-architectural events may be indicative of a core beginning to process instructions that may consume excess power.

In various embodiments, a current limiter 104 may be arranged to rapidly respond to detected micro-architectural events by adjusting operation of a respective core 106 at the level of micro-operations. As is known, the execution of a program consists of the sequential execution of instructions. Each instruction is executed during an instruction cycle made up of shorter sub-cycles (e.g., fetch, indirect, execute, interrupt). The performance of each sub-cycle involves one or more shorter operations, which may be generally referred to as micro-operations (pops).

In some embodiments, the input rate of pops executed by the core for each cycle may be reduced. This may take place within a clock cycle or very few clock cycles so that processing can be slowed within a very short period, such as within nanoseconds of when a current limiter 104 initiates an adjustment. Thus, each slice 110 may autonomously control current by rapidly reducing operations within a given processor unit 106 of that slice after detection of μ-arch events. In this manner, system 10 may prevent an excess current associated with the detected micro-architectural events that may otherwise result.

Examples of slowing down operation (throttling) of a core that system 10 may initiate include reducing instructions per cycle from four instructions per cycle to two instruction per cycle, or from four instructions per cycle to three instruction per cycle.

In some embodiments, in addition to performing a throttling of the core by adjusting pops rate, a core current limiter 104 may alert the power management unit 102 as to the throttling action for a given core 106. The core controller 104 may send information regarding the detected μ-arch events, or other information. In some embodiments, after the first, fast action response of the core current limiter, the power management unit may initiate a second, slower response to the potential current increase. The power management unit may take one or more slower actions to further adjust operation of the core in question, according to an evaluation of the information received from the core current limiter as well as other information concerning the present state of the core. These actions may include a reduction in core operating voltage, a reduction in core clock frequency and voltage, a raising of voltage guard bands, or other actions, as described further below. In some embodiments, the power management unit 102 may also decide to terminate the fast response actions, such as the pops throttling taken by the core current limiter 104. In some other embodiments, the fast action response may be omitted.

In some embodiments, the power management unit 102 may perform adjustments to operation of CPU cores 106 based upon information received from multiple core current limiters 104. For example, the power management unit 102 may base decisions to adjust power in individual or a set of cores 106 based upon the status of a group of cores 106. Thus, if multiple cores report throttling action in the same time period, the power management unit 102 may modify core power differently than if only one core reports throttling action.

By providing a system for responding to potential increases in current in a rapid and robust fashion, the present embodiments facilitate operation of a system under more optimum conditions, such as operation where less guard band voltage is employed. The high current limiters of the present embodiments may provide adequate assurance that the worst case currents do not develop, allowing the operating voltage to be set based upon a maximum current under normal operating conditions. Additionally, the provision of power management units to more optimally adjust core operations after a core throttling action is initiated, allows the core processors to run more efficiently by timely removal of core throttling once it is deemed safe to do so.

Figure 2:
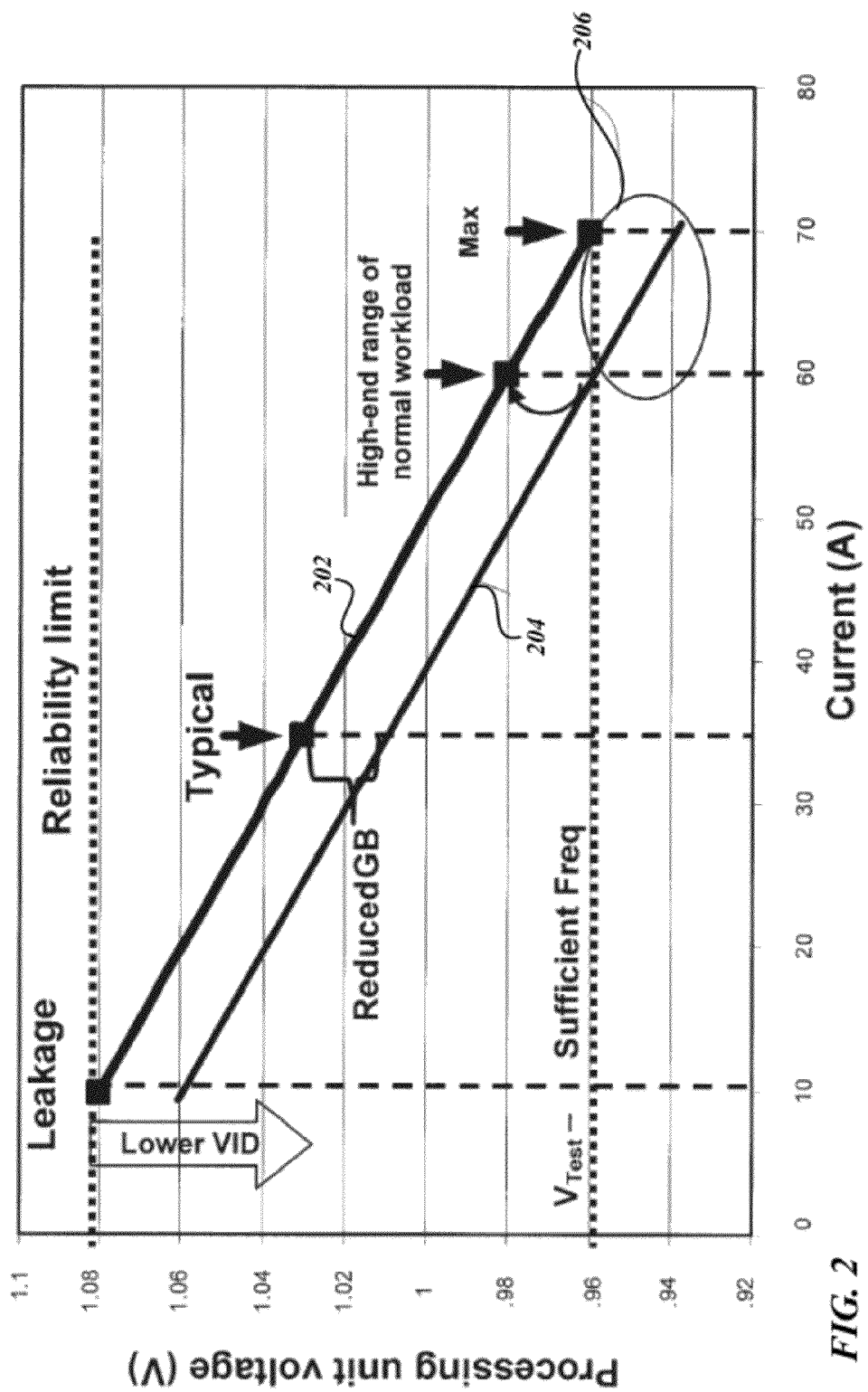
FIG. 2 illustrates current voltage characteristics for a processor operating in a conventional manner and in accordance with present embodiments.

In various embodiments, the system 10 may include a voltage regulator (not shown) that may be included within the die or set of dies containing cores 106 or may reside separately. The voltage regulator may adjust operation to account for the range of currents that may occur during operation of a CPU. FIG. 2 illustrates current voltage characteristics 202, 204 for a processor operating in a conventional manner and in accordance with present embodiments, respectively. For each condition, the voltage V may be controlled by a voltage regulator to account for the voltage drop as the current increases. In particular, a power management unit, such as power management unit 102, may provide a signal to a voltage regulator to output an appropriate voltage. The voltage decrease with increased current may represent the behavior of on-die voltage as a function of current and may be determined by load line resistance in the die. The operating voltage at zero current may be set to provide sufficient voltage to operate over the entire current range. Because of the voltage drop with increasing current, the operating voltage may be arranged to provide a minimum voltage that is sufficient to provide reliable performance when operating at high end of working range. The minimum voltage, Vtest (0.96 V in the example shown), may be that which provides sufficient clock frequency for reliable performance.

The high current protection systems of the present embodiments may provide sufficient protection against development of the worst case currents, so that processor operation occurs without the higher voltage guard bands used by conventional systems. Thus, for operation of a system in accordance with present embodiments, the curve 204 may have a Y-axis intercept of about 1.08 V, while for conventional operation (curve 202), the Y-axis intercept is about 1.1 V. The difference of about 20 mV in guard band voltage may be employed to provide better performance and/or lower energy consumption by a CPU according to different embodiments. In some embodiments, at the core or processor level, a difference of 20 mV may result in 4% reduction in power and a 2% increase in frequency.

According to various other embodiments, a high current protection system may result in greater reduction of guard band voltage than that depicted in FIG. 2. For example, the 20 mV reduction illustrated in FIG. 2 may be achieved when a single limit is used to trigger throttling action of the core. However, embodiments in which multiple limits may be employed for throttling of core operation, a greater reduction of guard band voltage may be realized, for example, up to about 50 mV.

In some embodiments that employ multicore processors, the benefits of reduced guard band voltage may be harnessed by controlling processor performance based upon the activity of individual cores. As an example, in some multi-core systems, a "turbo boost" technology may provide for dynamically increasing CPU clock speed on demand, such as when the operating system requests the highest performance state of a processor (CPU). If the processor has not reached its thermal and electrical limits and the user's workload demands additional performance, the processor clock frequency may dynamically increase. In a multicore processor, depending on the number of cores that are active, the process may increase its speed dynamically to a lesser or greater extent. For example, in a four core system, a processor may be able to dynamically adjust its frequency in steps (bins) of 100 MHz. With only one core active, an upward adjustment of 10 bins (1000 MHz) may be possible in an example of present day technology, while for two three and four active cores, the corresponding increases may be 900, 800, and 700 MHz, respectively. However, due to limitations imposed by the need to account for worst case current, the upward scaling of frequency may be much less, especially when multiple cores are active. By implementing the core throttling in which 50 mV of guard band voltage may be saved, up to one to two frequency bins may be saved in a multiple core processing arrangement, In other words, for a given set of active cores, the multicore system may operate at frequencies corresponding to one to two bins higher frequency than under conventional operation. Furthermore, for a given voltage regulator and given power supply current capabilities, the CPU can operate at higher turbo frequency at typical operation and lower the frequency only then high current conditions are detected.

In various embodiments the system 10 may be operable to throttle operation of one or more processor units 106 according to multiple limits for currents. Each limit may be associated with a set of micro-architectural events. In other words, a given limit may be established for a particular set of events that may be composed of one or more micro-architectural events. The one or more micro-architectural events may correspond to events known to be associated with activity that gives rise to high currents. Such events may be the result of benign operations or may be the result of malicious code. Examples of micro-architectural events (also termed "events" hereinafter unless otherwise indicated) that may serve as the basis for triggering action by a current limiter include micro-architecture instructions such as LOAD, STORE, ADD, SUBTRACT, MULT, SHIFT, AND, etc. In addition, the instructions may include input values and output values such as, for example, register values and/or constants. In various embodiments, the high current protection system 10 may be arranged to detect vector operations, including floating point operations, such as floating point multiply operations, and others. Other vector operations may include adding two vectors to produce a third, subtracting two vectors to produce a third, dividing two vectors to produce a third, loading a vector from memory, and storing a vector to memory. These and other μ-arch events may be particularly likely to give rise to increased currents and may therefore be screened for in order to prevent undesirable current excursions. In addition, a current limit may be associated with a power management state. For example, a sleep state event that puts the CPU in low power mode can be associated with a low current consumption state. The screening may include detecting the events and categorizing the detected events so that they can be compared against a limit that may be established for a particular category of events.

In some embodiments, a system, such as system 10, may be arranged to predetermine the effect on processor current consumption of changes in operation of one or more processing units. For example, during operation, a set of one or more processor cores may be operated in different states, such as C-states, which may reflect so-called idle states. For example, a family of core C-states may represent a hardware state, and may include several different core idle states that may be applied to a set of cores. A set of P states may correspond to power-performance states that includes a highest performance state (P0). During operation of system 10, it may be desirable to change operation of one or more of the set of processing units 106 between C-state and P-state or among various different C-states, for example. In this case, system 10 may act to determine whether the desired or incipient change of state will result in a current limit being exceeded before any architectural change takes place.

In further embodiments, PMU 102 may be arranged to calculate power consumption when an actual change in operation to processing units 106 takes place. This may be performed by calculating actual power consumption from detected micro-operations in one example. This may be useful for detecting and monitoring slowly increasing current events where the type of micro-operations that are associated with the detected current cause excessive current to develop on the time frame of about a millisecond or more. In such slowly developing current events, the system need not pre-calculate current but can perform a (potentially more) accurate measurement of developing current and still perform actions to stop excess current before any adverse condition fully develops.

In further embodiments, PMU 102 may be arranged to calculate power consumption of all the units 110 and activate slow or fast power reduction action based on the combined state of all units.

Figure 3:
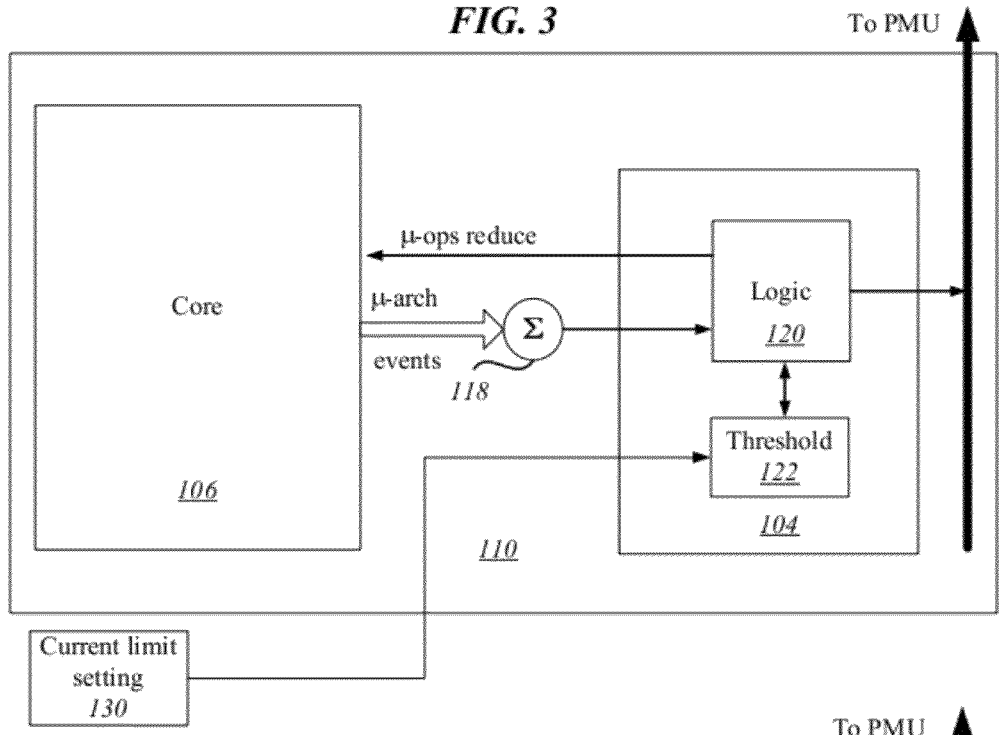
FIG. 3 illustrates an arrangement for core throttling according to some embodiments.

FIG. 3 illustrates a core slice 110 that depicts aspects of an architecture that facilitates core throttling according to some embodiments. As illustrated, micro-architectural events may be sent from core 106 to an accumulator 118, which may accumulate the events for sending to logic unit 120. The logic unit 120 may be arranged to process the accumulated μ-arch events to determine if any action need be taken based upon the events. In some embodiments, the events may be accumulated for a specific period of time in order to assess the rate at which such events are taking place. Logic unit 120 may examine the events and compare the events to a stored limit in threshold table 122, which may include a series of thresholds (limits) corresponding to different events or groups of events. If logic unit 120 detects that a limit is met (or, alternatively, exceeded), a signal to reduce μ-Ops processing rate may be sent to core 106.

Because the μ-arch events may be accumulated and read by logic 120 at clock cycle frequency, the μ-ops processing rate in core 106 may be reduced very quickly once suspect μ-arch events develop. In some embodiments, the event limits may be pre-defined limits for the rate of events (events/sec) for a given event type or given category of events, which, if exceeded, are deemed to signal possible development of high core current. In some embodiments, μ-arch events, e.g., floating point multiply instructions, may be accumulated for a predetermined period of time to determine an event rate for a particular limit. In one example, a limit may be simply a level of floating point multiplication instructions per second. According to some embodiments, the instructions (μ-arch events) may be pipelined such that a separate instruction may be fetched up to once every core processor clock cycle. Thus, if core 106 begins frequently executing floating point multiply instructions, the events may be rapidly accumulated by accumulator 118, triggering logic 120 to send instructions to reduce μ-ops input in core 106 after a very few clock cycles in some instances.

Figure 4:
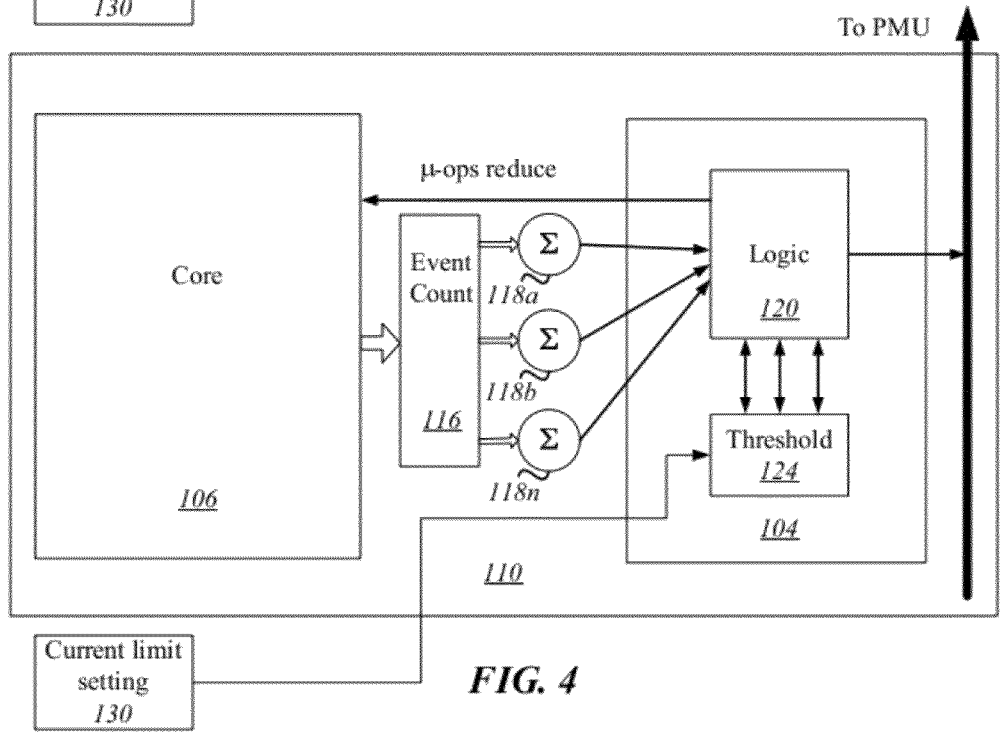
FIG. 4 depicts another arrangement for core throttling according to further embodiments.

FIG. 4 depicts another arrangement in which multiple accumulators 118 are coupled to logic unit 120 according to further embodiments. In this arrangement, the core 120 may output μ-arch events to an event counter 116 that may separate the detected μ-arch events into different categories of events. The different categories of μ-arch events may include events to be output to logic 120 for evaluation. Each separate category may correspond to a different μ-arch event or set of events associated with a different limit. Thus, one category of micro-architectural events may correspond to floating point multiplication, another may correspond to floating point division, and so forth. Upon receiving micro-architectural events from core 106, event counter may forward each event to an appropriate accumulator 118a, 118b, etc. Each accumulator 118 may accordingly accumulate one category of μ-arch event for eventual forwarding to logic unit 120. Each accumulator may be arranged to output accumulated micro-architectural events to logic unit 120 at a predetermined interval or according to another desired criterion for that accumulator.

Logic 120 may subsequently separately evaluate micro-architectural events associated with each accumulator, which, in turn, each may provide only one category of micro-architectural events. Logic 120 may then compare the results of accumulated micro-architectural events for each of accumulators 118 to respective limits associated with the different categories of micro-architectural events. A threshold table 124 may include a limit for each category of micro-architectural event collected in accumulators 118.

In various embodiments, current limiter 104 may initiate a throttling action for core 106 based upon information received from one or more of accumulators 118. In some embodiments, if any limit stored in threshold table 124 is exceeded, logic 120 may send an instruction to core 106 to reduce micro-operations processing rate. In one embodiment, each limit may correspond to a threshold rate of micro-architectural events for a given category of events. Thus, if any accumulator 118 outputs events that exceed a threshold rate, a throttling of core 106 may be initiated. In this way, current limiter 104 may ensure that no excess current conditions are likely to develop. In other embodiments, a decision to throttle operation of core 106 may be based upon a combination of inputs from multiple accumulators. For example, slice 110 may comprise 6 accumulators that each collect different micro-architectural events corresponding to a different category, where each category is associated with a different event limit. The decision to initiate a core throttling action may be based upon the total number of categories of micro-architectural events that exceed their respective limits. Thus, for example, if only one limit is found to be breached by logic 120, then current limiter 104 may decide not to initiate a throttling action, while if two or more limits are breached, a throttling action may be triggered. In other embodiments, throttling may be determined based upon the category of micro-architectural events found to exceed a limit. Thus, a single limit breach for floating point multiply operations may trigger a throttling action, because this may be deemed to likely give rise to a problematic increase in processor current. However, a single breach of another, less problematic, micro-architectural events category, may not automatically trigger core throttling.

In addition to deciding when to trigger throttling of core 106, logic 120 may also decide when to report information related to the micro-architectural events collected from core 106. Referring again to FIGS. 1, 3 and 4, in some embodiments, after each instance of sending instruction to reduce micro-operations processing to core 106, the current limiter 104 may forward a message reporting the core throttling action to power management unit 102. In some embodiments, the information may include the category or categories of micro-architectural events that gave rise to the throttling action. In other embodiments, even if a detected breach of a micro-architectural event limit does not trigger a throttling action, the breach of the limit may be reported to power management unit 102, which may decide to initiate other action based upon the information received.

As noted above, the system 10 may initiate various actions upon detecting a breach of a limit to micro-architectural events. If a throttling action is initiated by current limiter 104, the power management unit 102 may initiate a transition to a low power mode upon notification of the breach. The power management unit may also send instructions to release the core throttling action upon initiating the low power mode, since the lower voltage and/or operation frequency of the low power mode may be sufficient to address the potential high current event associated with the detected breach.

In some embodiments, the power management unit may adjust guard bands to allow the CPU to operate at a high-end of its current consumption range, shown generally as section 206 of FIG. 2. This may be done by the PMU 102 setting a high voltage at approximately 1.1 V corresponding to the y-intercept of the load line 202.

In various embodiments, the high current protection system 10 may continue to monitor micro-architectural events generated by a processor core after a throttling action is triggered. Thus, logic unit 120 may receive updated information from accumulators 118 that demonstrate a change in event rate of micro-architectural events of interest, which may indicate that a previously breached limit is no longer exceeded. For example, after a detected breach (or breaches) of a micro-architectural event limit, one or more accumulators 118 may continue to accumulate µ-arch events from the core 106. After forwarding of the accumulated events to logic unit 120, it may be determined that the µ-arch event rate no longer exceeds a limit for triggering the throttling of core 106. When the system 10 determines that the µ-arch event rate for one or more categories of micro-architectural events no longer exceeds a respective limit, the system may perform one of various actions. In the case where core throttling is still in place, the power management unit 102 or the logic unit 120 may send instructions to release the core throttling, leading to, for example, resumption of normal µ-ops input rate in core 106. If core throttling is not in place, but the core is currently operating at reduced voltage and/or frequency, the relevant operating voltage and/or frequency may be restored by instructions from the power management unit 102. In some cases, the system 10 may take no action upon detection that the rate of events has dropped below a limit. For example, if a response is initiated by system 10 to the breaches of several limits representing several different categories of micro-architectural events, it may later be determined that one of the limits is no longer in breach. However, if other limits remain in breach, the system may determine that low power operation of the core 106 and/or core throttling 106 continue.

In various other embodiments, a power management unit 102 may initiate actions in a multiple processor core CPU based upon information received from multiple cores. Referring again to FIG. 1c, the PMU 102 may collect information at various instances from cores 106a-d, which may include µ-arch event rates from one or more of the cores 106, notification of any throttling actions initiated by the current limiters, etc. The PMU may evaluate the accumulated µ-arch event rates from the various cores 106 in order to decide whether to take an action, such as raising of a voltage guard band. Thus, if only one core 106a has reported a limit breach, while cores 106b-d do not show a breach of µ-arch event rate limits, the PMU 102 may determine that no adjustment to a voltage regulator (not shown) for cores 106a-d is needed.

In further embodiments, the power management unit 102 may evaluate information received from different types of cores differently and accordingly initiate any actions separately. For example, the CPU graphics processor 106e may be controlled by a different voltage regulator (not shown) than that used to control processor cores 106a-d. Thus, in one example, PMU 102 may instruct the voltage regulator for cores 106a-d to raise guard bands in response to a set of reported breaches of µ-arch event rate limits in one or more of cores 106a-d. At the same time, if no breaches are reported from graphics processor 106e, the voltage regulator for graphics processor 106e may continue to operate without raised guard bands.

Figure 5A:
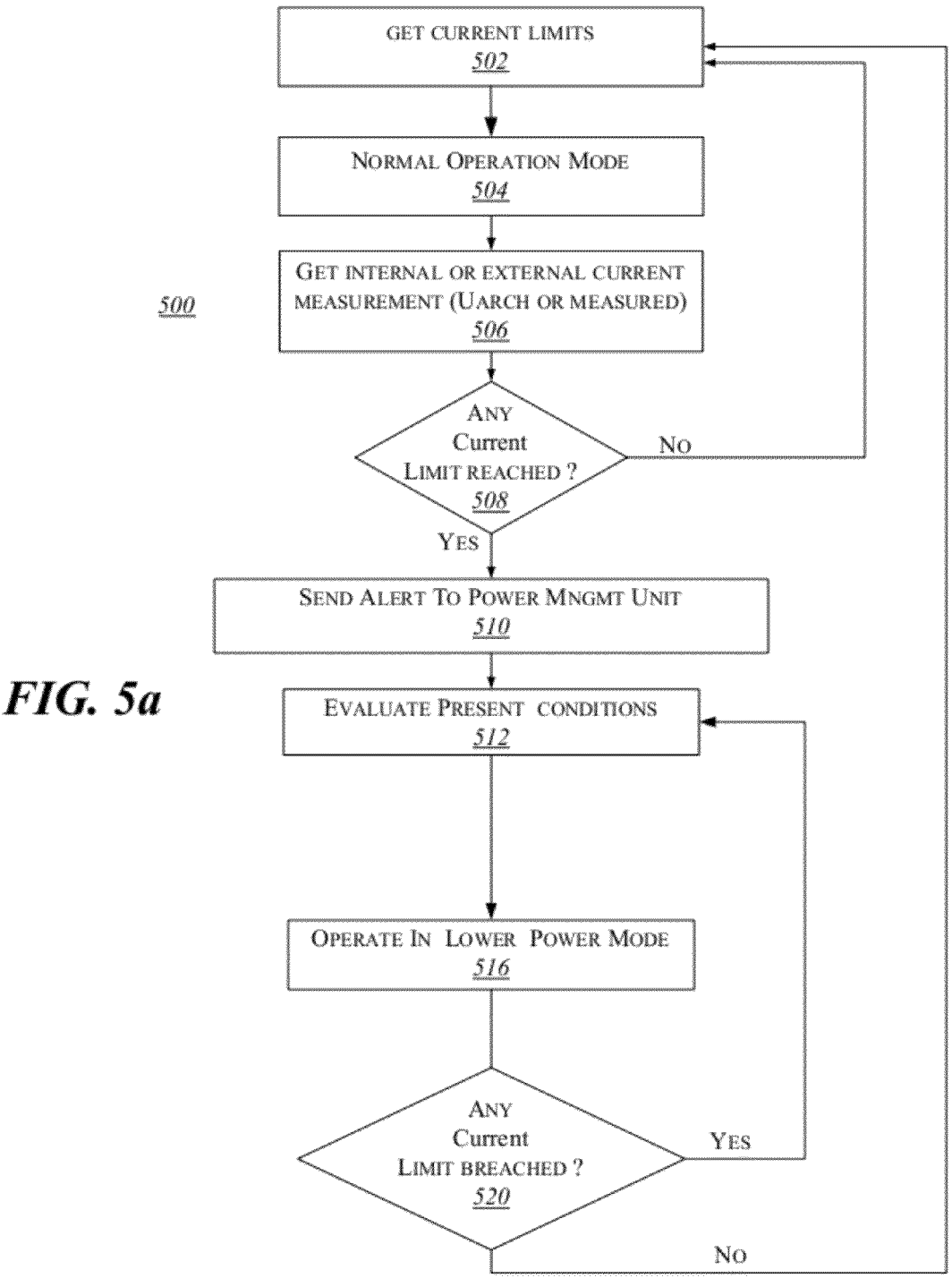
FIG. 5a depicts aspects of a method of high current protection.

FIG. 5a depicts aspects of a method 500 of high current protection. At block 502 a set of current limits is provided. This set may be provided to a current limiter 104 and/or PMU 102 as discussed above. At block 504 a CPU operates under normal operating conditions. The "normal operating conditions" may be those provided by the high current protection systems of the current embodiments. Thus, referring also to FIG. 2, normal operating conditions may be operating under reduced guard band voltage curve 204. Normal operating conditions may also denote operating core processors at a standard throughput, such as 4 instructions wide per cycle. At block 506, an internal or external current measurement is obtained. The "current measurement" may be derived from monitoring processor activity, such as the micro-architectural events being monitored during core operation, or may be directly measured, in one or more microprocessor cores or graphics processor cores.

Figure 6:
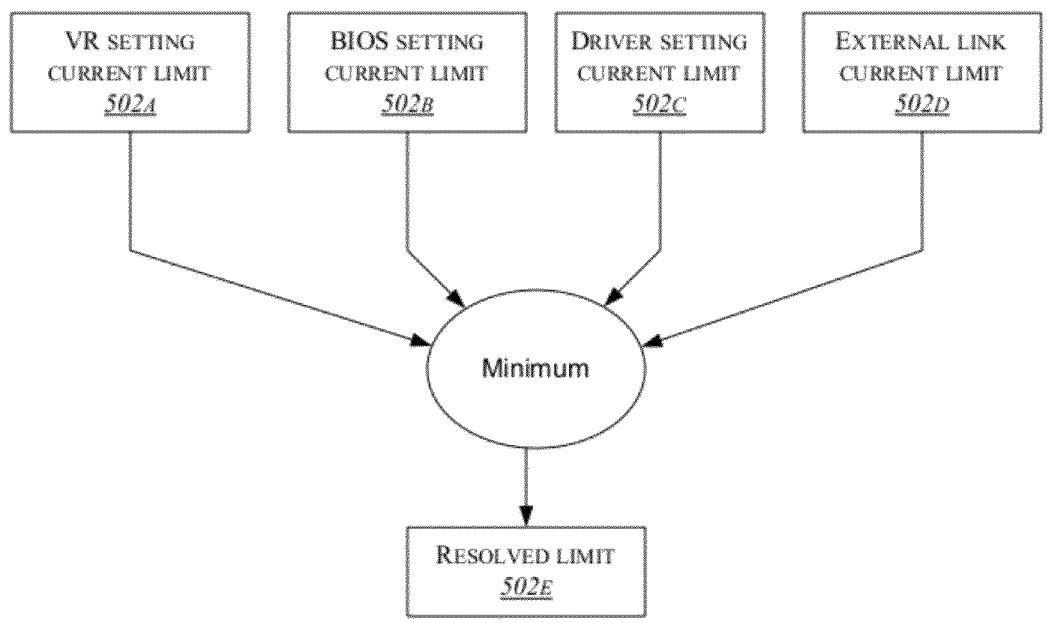

FIG. 6 depicts one embodiment of processes that may be involved in the monitoring block 502. The current limit may be set by different sources such as Voltage Regulator (502*a*), BIOS (502*b*), Driver (502*c*) or Embedded Controller (502*d*). These limits may be collected to produce a resolved current limit 502*e*. As discussed previously, the limits may pertain to different types of current limits, which may include categories of micro-architectural events of interest, such as those deemed likely to give rise to high currents in processors executing those micro-architectural events. The limits may be stored in a convenient memory for retrieval by a current limiter.

Turning once more to FIG. 5*a*, at block 508, if no current limits, such as micro-architectural event rate limits, are breached, then the method returns to block 502. If a limit is breached, the method proceeds to block 510.

Figure 5B:
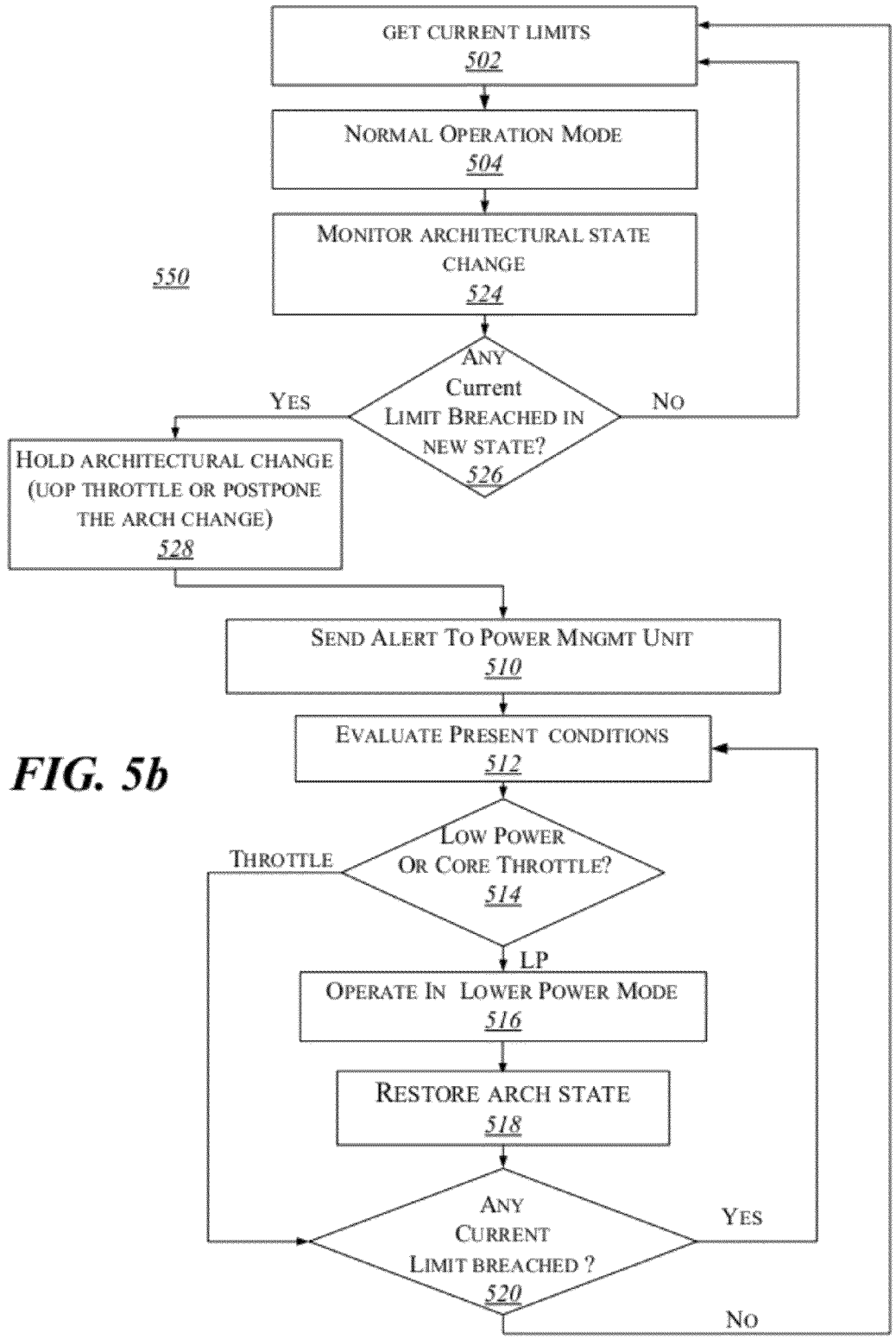
FIG. 5b depicts aspects of another method of high current protection.

In one or more instances the methods depicted in FIG. 5*a* or 5*b* may reside together and perform the process described above for each individual slice (computational block) 110 or any combination of one or more computational block such as all general purpose CPUs including or excluding a GFX block At block 510, an alert is sent to a power management unit that indicates that a throttling action in a processor has been initiated. The alert may also indicate information specifying the type of limit that has been breached.

At block 512, the present operating conditions of a CPU are evaluated. The evaluation may determine the status of one or more cores, such as whether all are operating under normal mode, and the current micro-architectural event rates.

At block 516, a processor is placed in low power mode. The low power mode may entail operating at lower voltage or at a combination of lower voltage/clock frequency. In some embodiments, all cores of a multi-core processor may be placed in low power mode.

At block 520, it is determined whether any current limits are presently breached. If any limits are still exceeded, the method moves to block 512, where an evaluation of present conditions is conducted, and a decision as to whether to operate under low power or maintain core throttling is made anew. If no limits are presently exceeded the method moves to blocks 502 and then 504 and the processor core(s) resume normal operation.

FIG. 5*b* depicts aspects of another method 550 of high current protection. Following the blocks 502 and 504 previously discussed, the method moves to block 524. At block 524, a system is monitored for a change in architectural state in one or more processing units. This change in state may be a change in operation of one or more cores from C-states to P-states, as previously discussed. In some embodiments, the state change may be a scheduled change to be implemented but that has not taken place. At block 526, a determination is made as to whether any current limit is breached in the new state to be entered into from a present state. If no breach is found, then the method returns to block 502.

If a limit breach is detected, the method moves to block 528, where the change of state to be implemented may be prevented from taking place, or where a throttling action is initiated in the processing(s) unit in question. For example, a change of state to be implemented may involve exiting a C-state in a processor core and activating additional cores of a multi-core CPU. However, if the state change to be implemented is determined to produce a current that exceeds a limit, the system may alter the as-yet unimplemented state change by dropping a P-state before activating new core(s).

The method then proceeds through blocks 510-512 as described above.

At block 514, based upon the evaluation of present conditions, a decision is made whether to transition to a low power mode for a processor or to initiate a throttling action. If a decision is made that low power mode is not to be initiated, the throttling action may be initiated and the method moves to block 520. If low(er) power mode is to be initiated, the method moves to block 516 and then 518, where the architectural state of the processing units prior to block 524 is reestablished (restored). The method then proceeds to block 520 where a determination is made as to whether any current limits are still in breach, as described above.

Figure 7:
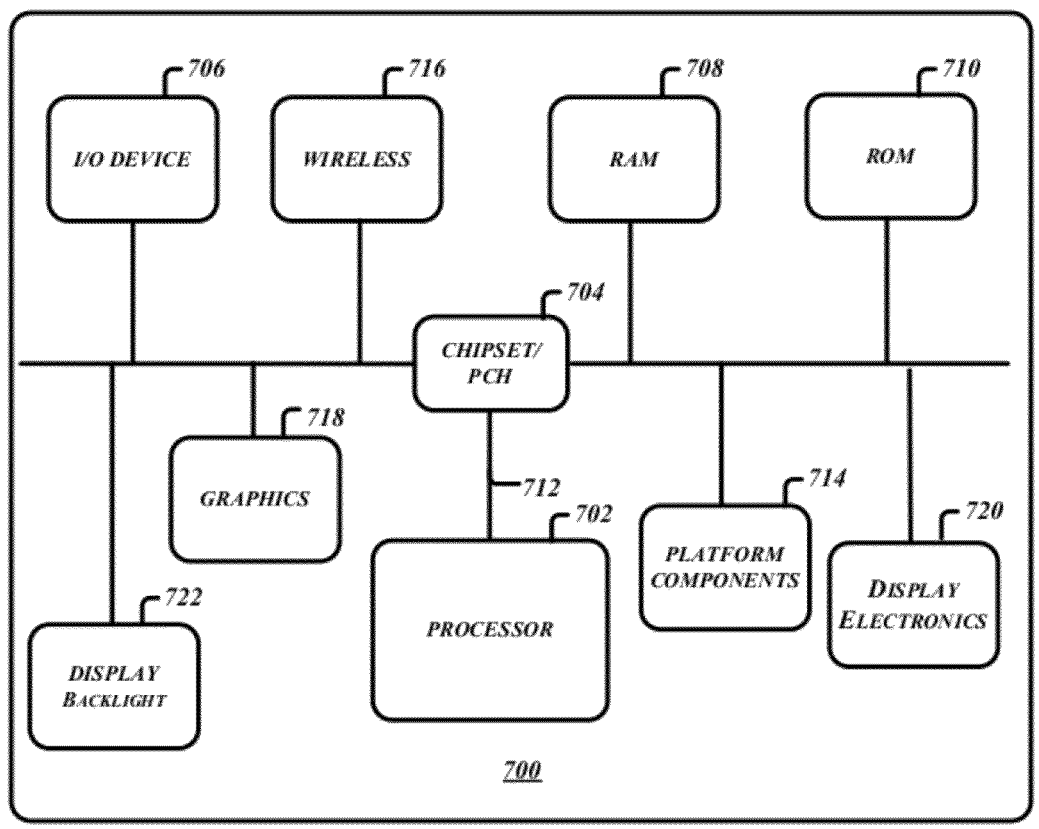
FIG. 7 is a diagram of an exemplary system embodiment.

FIG. 7 is a diagram of an exemplary system embodiment. In particular, FIG. 7 is a diagram showing a platform 700, which may include various elements. For instance, FIG. 7 shows that platform (system) 700 may include a processor/graphics core 702, a chipset/platform control hub (PCH) 704, an input/output (I/O) device 706, a random access memory (RAM) (such as dynamic RAM (DRAM)) 708, and a read only memory (ROM) 710, display electronics 720, display backlight 722, and various other platform components 714 (e.g., a fan, a crossflow blower, a heat sink, DTM system, cooling system, housing, vents, and so forth). System 700 may also include wireless communications chip 716 and graphics device 718. The embodiments, however, are not limited to these elements.

As shown in FIG. 7, I/O device 706, RAM 708, and ROM 710 are coupled to processor 702 by way of chipset 704. Chipset 704 may be coupled to processor 702 by a bus 712. Accordingly, bus 712 may include multiple lines.

Processor 702 may be a central processing unit comprising one or more processor cores and may include any number of processors having any number of processor cores. The processor 702 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 702 may be multiple separate processors located on separate integrated circuit chips. In some embodiments processor 702 may be a processor having integrated graphics, while in other embodiments processor 702 may be a graphics core or cores.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a computer-readable medium or article which may store an instruction or a set of instructions that, if executed by a computer, may cause the computer to perform a method and/or operations in accordance with the embodiments. Such a computer may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a set of one or more processor cores of a processor; and
a set of current limiters, each current limiter coupled to a respective processor core and arranged to monitor processor activity in the processor, to compare the processor activity to one or more current limits, and to initiate a current-limiting action when the one or more current limits is exceeded, each current limiter arranged to store a multiplicity of limits, each limit corresponding to a respective set of micro architectural events in a given processor core.

2. The apparatus of claim 1, the current-limiting action comprising a throttling action for the given processor core when a limit for rate of one or more sets of micro-architectural events is breached.

3. The apparatus of claim 1, the throttling action comprising reducing a rate of micro operations input in a processor core.

4. The apparatus of claim 1, the current limiting action comprising postponing a state change in the operation of one or more processor cores.

5. The apparatus of claim 1, comprising a power management unit coupled to each current limiter, the power management unit arranged to:
receive a set of current limits from one or more of a voltage regulator, a BIOS, and a driver;
receive a warning signal indicating breach of a current limit;
evaluate processor core operating conditions in one or more processor cores; and
determine whether to initiate a low power mode based upon the processor core operating conditions in the one or more processor cores.

6. The apparatus of claim 5, the low power mode comprising one or more of: operating at reduced voltage of a processor core, and operating at reduced voltage and clock frequency of the processor core.

7. The apparatus of claim 5, the power management unit arranged to restore an architectural state of a processor core after initiating the low power mode.

8. The apparatus of claim 5, the power management unit arranged to manage power in a multiplicity of processor cores, and to determine whether to initiate a low power mode based upon detected processor activity in more than one processor core.

9. A method, comprising:
monitoring processor activity in one or more processor cores of a processor;
storing a multiplicity of limits in one or more current limiters of the processor, each limit corresponding to a respective set of micro architectural events in a given processor core;
comparing the processor activity to one or more current limits of the multiplicity of limits; and
initiating a current-limiting action when the one or more current limits is exceeded.

10. The method of claim 9, the current-limiting action comprising initiating a throttling action for the given processor core when a limit for rate of one or more sets of micro architectural events is breached.

11. The method of claim 10, the throttling action comprising reducing a rate of micro operations input in a processor core.

12. The method of claim 9, the one or more limits comprising a calculated current for a new core state scheduled for one or more processor cores.

13. The method of claim 12, the current limiting action comprising postponing a state change in the operation of the one or more processor cores.

14. The method of claim 9, comprising, in a power management unit of the processor:

receiving a set of current limits from one or more of a voltage regulator, a BIOS, and a driver;

receiving a warning signal indicating breach of a current limit;

evaluating processor core operating conditions after receiving the warning signal; and determining whether to initiate a low power mode based upon the processor core operating conditions.

15. The method of claim 14, comprising one or more of: operating at reduced voltage of a processor core, and operating at reduced voltage and clock frequency of the processor core.

16. The method of claim 14, comprising restoring an architectural state of a processor core after initiating the low power mode.

17. The method of claim 14, comprising:

managing power in a multiplicity of processor cores, and determining whether to initiate a low power mode based upon detected processor activity in more than one processor core.

18. An article comprising a non-transitory computer-readable storage medium containing instructions that if executed by a processor enable a system to:

monitor processor activity in one or more processor cores;

store a multiplicity of current limits, each current limit corresponding to a respective set of micro architectural events in a processor core;

compare the processor activity to one or more current limits of the multiplicity of current limits; and initiate a current-limiting action when the one or more current limits is exceeded.

19. The article of claim 18, comprising instructions that if executed by a processor enable the system to:

initiate a throttling action for that processor core when a limit for rate of one or more sets of micro-architectural events is breached.

20. The article of claim 18, comprising instructions that if executed by a processor enable the system to reduce a rate of micro-operations input.

21. The article of claim 18, comprising instructions that if executed by a processor enable the system to:

calculate current for a new core state scheduled for one or more processor cores; and postpone a state change in operation of the one or more processor cores.

22. The article of claim 18, comprising instructions that if executed by a processor enable the system to:

receive a set of current limits from one or more of a voltage regulator, a BIOS, and a driver;

receive a warning signal indicating breach of a current limit;

evaluate processor core operating conditions after receiving the warning signal; and determine whether to initiate a low power mode based upon the processor core operating conditions.

23. The article of claim 22, comprising instructions that if executed by a processor enable the system to perform one of: operating at reduced voltage of a processor core, and operating at reduced voltage and clock frequency of the processor core.

24. The article of claim 22, comprising instructions that if executed by a processor enable the system to restore an architectural state of a processor core after initiating the low power mode.

25. The article of claim 18, comprising instructions that if executed by a processor enable the system to manage power in a multiplicity of processor cores; and determine whether to initiate a low power mode based upon detected processor activity in more than one processor core.

26. A system, comprising a computing device comprising one or more platform components; and a processor comprising:

a set of current limiters, each current limiter coupled to a respective processor core and arranged to monitor processor activity in the processor, to compare the processor activity to one or more current limits of a multiplicity of stored current limits, each stored current limit corresponding to a respective set of micro architectural events in a processor core; and to initiate a current-limiting action when the one or more current limits is exceeded.

27. The system of claim 26, comprising a power management unit coupled to each current limiter, the power management unit arranged to:

receive a set of current limits from one or more of a voltage regulator, a BIOS, and a driver;

receive a warning signal indicating breach of a current limit;

evaluate processor core operating conditions after receiving the warning signal; and determine whether to initiate a low power mode based upon the processor core operating conditions.

28. The apparatus of claim 27, the current limiting action comprising postponing a state change in operation of one or more processor cores.

* * * * *

UNITED STATES PATENT AND TRADEMARK OFFICE
CERTIFICATE OF CORRECTION

PATENT NO.          : 8,539,269 B2                                    Page 1 of 1
APPLICATION NO.     : 13/077618
DATED               : September 17, 2013
INVENTOR(S)         : Efraim Rotem et al.

It is certified that error appears in the above-identified patent and that said Letters Patent is hereby corrected as shown below:

In the Claims

In column 14, line 13, in claim 3, delete "micro operations" and insert -- micro-operations --, therefor.

In column 14, line 58, in claim 11, delete "micro operations" and insert -- micro-operations --, therefor.

Signed and Sealed this
Tenth Day of December, 2013

Margaret A. Focarino
*Commissioner for Patents of the United States Patent and Trademark Office*